Dec. 20, 1966   G. W. LESCHER ETAL   3,292,300
TOY LAWN MOWER WITH VISIBLE RECIPROCATING PISTONS
Filed Oct. 28, 1963   2 Sheets-Sheet 1
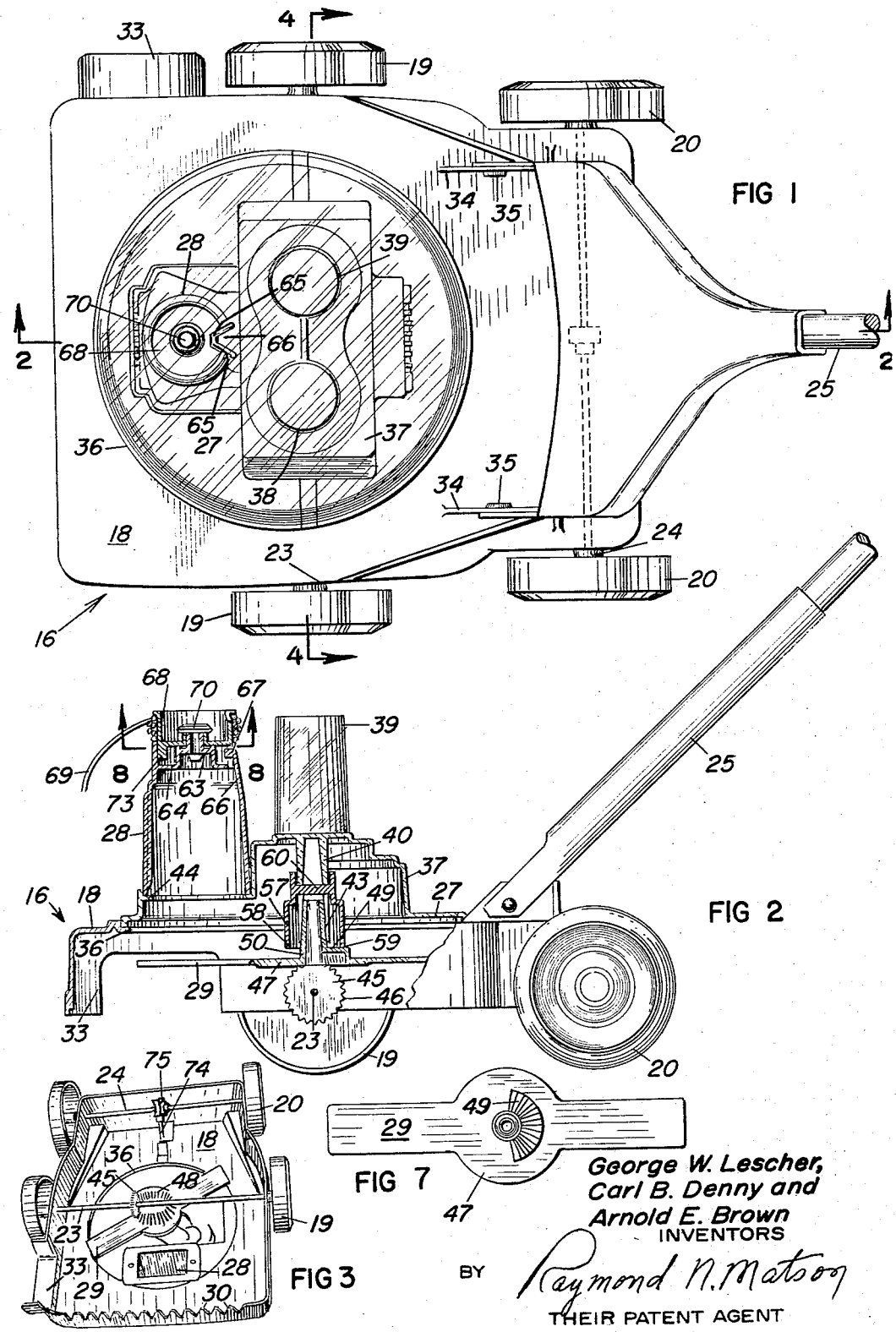
George W. Lescher,
Carl B. Denny and
Arnold E. Brown
INVENTORS
BY Raymond N. Matson
THEIR PATENT AGENT Dec. 20, 1966    G. W. LESCHER ET AL    3,292,300
TOY LAWN MOWER WITH VISIBLE RECIPROCATING PISTONS
Filed Oct. 28, 1963    2 Sheets-Sheet 2
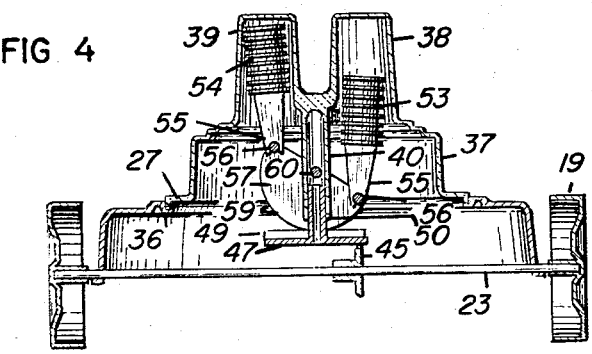
George W. Lescher,
Carl B. Denny and
Arnold E. Brown
INVENTORS
BY Raymond H. Matson
THEIR PATENT AGENT United States Patent Office 3,292,300
Patented Dec. 20, 1966

3,292,300
TOY LAWN MOWER WITH VISIBLE
RECIPROCATING PISTONS
George W. Lescher, Nashville, Carl B. Denny, Vanleer, and Arnold E. Brown, Nashville, Tenn., assignors to Kusan, Inc., Nashville, Tenn., a corporation of Kentucky
Filed Oct. 28, 1963, Ser. No. 319,461
4 Claims. (Cl. 46—39)

This invention relates generally to toys and more particularly to a toy lawn mower which simulates the sound, operation and appearance of a real mower.

The main object of the present invention is to provide a toy lawn mower having a simulated engine, starter and rotary grass cutting element, all so constructed and arranged and operable as to produce a safe, fascinating and intriguing toy for children.

An important object of the present invention is to provide a toy lawn mower provided with a simulated, reciprocating type engine having cylinders containing visible reciprocating pistons, and a visible rotary cutting element, the pistons and cutting element being driven by a pair of wheels of the mower upon forward or reverse movement thereof.

Another important object of the present invention is to provide a toy lawn mower novel means for converting the rotary motion of the wheels and rotary cutting element into reciprocatory motion of the pistons which enables a highly simplified assembly of the mower parts with resultant assembly cost economies.

A further important object of the present invention is to provide a simulated toy lawn mower having differently colored, visible reciprocating pistons and a visible, colored blade rotating in a different plane from that of the reciprocating pistons so as to comprise a colorful, plural motion toy which will attract and hold the attention and interest of children propelling or watching the same.

A still further important object of the present invention is to provide a toy lawn mower for children which is adapted to be propelled along the surface of the ground by means of a conventional handle, and is equipped with noise making mechanism to simulate the noise of the cord recoil starter and engine operation of a real lawn mower.

Another object of the present invention is to provide a toy lawn mower of the type described which will be simple and practical in construction, rugged and of long life in use, and susceptible of ready and economical manufacture and assembly.

Other objects and advantages of the invention will become apparent during the course of the following description.

In the drawings, we have shown two embodiments of the invention. In these showings:

FIGURE 1 is a top plan view of the preferred embodiment of the toy lawn mower comprising the present invention;

FIGURE 2 is a central, vertical sectional view taken on the line 2—2 of FIGURE 1, parts being shown in elevation;

FIGURE 3 is a bottom perspective view of the invention to a reduced scale showing a portion of the piston reciprocating mechanism, and the engine operation simulating noise maker;

FIGURE 4 is a transverse, vertical sectional view to and enlarged scale taken on the line 4—4 of FIGURE 1;

FIGURE 5 is a side elevational view to a further enlarged scale of the wheel or axle actuated walking beam which effects reciprocation of the pistons;

FIGURE 6 is an end elevational view thereof;

FIGURE 7 is a top plan view of the simulated rotary cutting element;

FIGURE 8 is a horizontal sectional view taken on the line 8—8 of FIGURE 2, of the simulated recoil starter noise maker;

FIGURE 9 is a top plan view to a reduced scale of a modified form of the preferred embodiment of the invention which differs only in that the entire mower housing is transparent;

FIGURE 10 is a rear elevational view of a second embodiment of the invention;

FIGURE 11 is a side elevational view thereof; and

FIGURE 12 is a top plan view thereof.

Referring to the drawings, numeral 16 designates the preferred embodiment of the invention as a whole which comprises a generally rectangular, inverted bowl-shaped housing 18 closely simulating a real mower housing, spaced front and rear supporting wheels 19 and 20 fixed to the ends of axles 23 and 24 respectively, journalled in the housing, a conventional T-shaped handle 25 for propelling and steering the mower, a supporting structure 27 for a simulated reciprocating engine housing 37 and a simulated recoil starter housing 28, and a simulated rotary cutting blade 29.

While the housing 18 may be formed of any suitable material, it is preferably molded from hi-impact polystyrene plastic which may be any desired opaque color or completely transparent as indicated at 18' in FIGURE 9. The front of the housing 18 is slotted as at 30 (FIGURE 3) and a grass discharge duct 33 communicating with the interior of the housing, is formed integrally with it at the front of the right side to accurately simulate real mower housings. A pair of transversely spaced, upstanding brackets 34 are formed at the rear of the upper surface of the housing 18 for connection with the spaced lower ends of the propelling handle 25 as is conventional, the brackets including projections 35 to support the handle in the at-rest position of FIGURE 2.

As shown in FIGURES 1-3, 4 and 9, the housing 18 includes a large circular opening defined by a shouldered, inwardly projecting flange 36 and in which the circular supporting structure 27 is mounted. The mower engine is simulated by a transparent housing 37 which with the circular supporting structure 27 is integrally molded of crystal polystyrene. The housing includes a spaced pair of upstanding cylinders 38, 39, a downwardly projecting open, bearing tube 40 having a pair of longitudinally extending, diametrically opposed slots 43, and an opening defined by a second shouldered, inwardly projecting flange 44 in which the starter housing 28 is mounted.

It is to be noted that the circular supporting structure 27 and the engine housing 37, being integrally molded of transparent plastic, will render visible the reciprocation of the pistons and the rotary cutting element to be described, so that the housing 18 may be molded of an opaque plastic of any desired color. However, as illustrated in FIGURE 9, the housing 18', the circular supporting structure 27, and the engine housing 37 may all be integrally molded in one piece of transparent plastic to simplify the construction while rendering the movable parts visible.

As is best shown in FIGURE 2, the axle 23 is aligned with the axis of the bearing tube 40 and is provided with a friction drive wheel 45 which may be of relatively soft rubber or have a serrated periphery 46 as shown. The simulated grass cutting element in the form of a blade 29 (FIGURES 2, 3, 4 and 7) includes a hub 47, the lower surface of which is provided with radial serrations 48 with which the serrated periphery 46 of the drive wheel 45 meshes. The upper surface of the blade hub 47 is provided with a raised arcuate, radially serrated portion or cam 49 and an upstanding tubular bearing 50 by which the rotatable blade element 29 is mounted in the downwardly extending bearing tube 40. The drive wheel 45 is positioned on the axle 23 so as to engage the radially outer portions of the blade hub serrations 48 and it will be apparent that movement of the mower 16 along a surface will effect rotaton of the wheels 19 and 20 and the drive wheel 45 and thusly, of the rotary cutting element 29.

Referring to FIGURES 2 and 4, it will be seen that pistons 53 and 54 are respectively reciprocably mounted in the transparent cylinders 38 and 39 and are directly snap connected at their lower ends 55 by means of distortable, partially closed slots, to the outermost transverse connecting members 56 of a walking beam 57 formed of two spaced, arcuate sectors or members whose arcuate peripheries 58, 59 are serrated so as to alternately mesh with the raised semi-circular portion 49 of the upper surface during each revolution of the cutting element hub 47 which supports it. The walking beam is restrained to a balanced pivotal or rocking movement in the direction of a plane parallel to the bearing tube 40 by a central, also sector-connecting, pivot pin 60 (FIGURES 2 and 5) which is inserted in the bearing tube slots 43.

It will be appreciated that the above described walking beam construction comprises a substantial and highly advantageous improvement over normal means for converting horizontal rotary motion into vertical reciprocating motion in view of its simplicity as compared to the usual crankshafts and connecting rods, and affords a resultant ease of assembly with the mower as will be described.

It will be readily understood that movement of the mower 16 along a surface effects rotation of the supporting wheels and hence of the friction drive wheel 45 which has a press fit on its axle 23 as do the wheels 19. Rotation of the simulated grass cutting element 29 is thus effected through the meshing of the drive wheel 45 with the teeth 48 on hub 47. As one or the other of the two sectors of the walking beam 57 always rests upon the raised, arcuate, radially serrated hub or cam portion 49, rotation of the hub will alternately engage the sectors of the walking beam 57 to rock it from the position shown in FIGURE 4 where the piston 54 is at the upper end of the transparent cylinder 39 to a position where the piston 53 is at the upper end of the transparent cylinder 38, and back again during each full revolution of the cutter element 29 and its hub 47.

The simulated starter housing 28 is substantially closed at the top by a cord reel bearing 63 which is shaped to provide a circular recess 64 (FIGURE 2) and the upper rear of the housing is slotted as at 65 to provide a resilient clicker tongue 66 (FIGURE 1), the upper end thereof being inturned and tapered as at 67. A recoil starter type reel 68 which is provided with a pull cord 69, is journalled on the bearing 63 and retained thereon by a snap rivet 70. As shown in FIGURE 8, the bottom of the reel 68 is provided with a plurality of angularly spaced, depending pegs 73 which move in the circular recess 64 under the action of the cord 69 and successively engage the tapered side faces of the upper end 67 of the clicker tongue to thus audibly simulate the starting of the mower engine.

The noise of operation of a real lawn mower is simulated by means of a similar resilient tongue 74 (FIGURE 3) which is fixed to the underside of the housing 18 and extends against a clicker gear 75 which has a press fit on the axle 24.

The toy mower 16 is readily assembled by first supporting the unitary housing 18′ of FIGURE 9 in inverted position, or by first seating the integral circular supporting structure 27 and engine housing 37 in the flange 36 of the housing 18 and securing it by a suitable adhesive or by heat fusing and then supporting this assembly in inverted position.

The lower ends 55 of the pistons 53 and 54 are now snapped over the central portion of the end transverse connecting members 56 of the walking beam 57 and the pistons then fitted into the cylinders 38 and 39 with the central or pivot pin 60 of the walking beam being positioned in the slots 43 of the bearing tube 40 (FIGURE 4). The cutting element or rotatable blade 29 is now positioned by inserting its bearing 50 in the bearing tube 40. The drive wheel 45 or means for driving the pistons and the simulated blade as described, is now press fitted in proper position on the axle 23 whose ends are then inserted through their housing journals to receive the press fitted wheels 19. The tongue 74 is affixed to the housing 18 and upon installation of the clicker gear 75, axle 24, and wheels 20, the toy mower may now be inverted for support on its wheels.

All that remains to be done at this point of the assembly is to assemble the engine starter housing 28 and its reel 68, seat it on the flange 44 and secure it by a suitable adhesive or heat fusion. The toy mower is now ready for packaging with its handle 25 which is readily attachable without tools by the purchaser.

Aside from the transparent portions of the toy mower referred to earlier herein which enable a child operator to see the rotation of the simulated grass cutting element or blade 29, the reciprocation of the pistons 53, 54 in the transparent cylinders 38, 39, and the rocking of the walking beam 57 as it effects reciprocation of the pistons, the various parts are molded of bright different colored plastics which greatly enhance the appearance of the toy as a whole and emphasize the number of different parts and their various types and planes of motion. For example, the housing 18, the reel 68 and the handle 25 may be a bright red, the wheels and one piston may be a bright yellow, the other piston may be blue, and the engine starter housing 28 and the walking beam may be a bright green—all to comprise an attractive and intriguing motion toy for a child.

Instead of the rotary blade type, simulated power lawn motor 16 above disclosed, all of the principles of the invention herein disclosed are readily embodied in a reel type, simulated power lawn mower 76 as illustrated by FIGURES 10, 11 and 12. In this form of the invention, the mower indicated as a whole by numeral 76 comprises essentially a transparent supporting structure 77 for a transparent reciprocating engine housing 78 and a simulated recoil starter housing 79, supporting wheels 80 for the structure, a housing or frame 81 supporting the structure 77, a rotatably mounted reel type cutting element 83 journalled in the structure, and a conventional propelling handle 84. The entire housing or frame 81 may be molded of transparent plastic and if desired, may be molded integrally with the supporting structure 77 and the simulated engine housing 78.

The engine housing includes a pair of transparent cylinders 86, each including a piston 87 reciprocable by a walking beam 88 resting on a cam disk 89 as in the first embodiment, and driven by a drive wheel 90 which is drivably connected with the supporting wheels 80 by a shaft 93 and belt and pulley arrangement 94 connecting with the wheel axle 95 upon which the reel type cutting element 83 is mounted. Thus, as in the first embodiment, movement of the reel type toy mower along a surface will effect a rotation of the reel (whose blades may be of different colors) visible to the operator as well as a reciprocation of the differently colored pistons 87. The structure of the starter housing and reel is as previously described to simulate engine starting noise while that of engine operation is simulated by a clicker gear 96 fixed to the wheel axle 95 and a resilient tongue 97 fixed to the housing or frame 81.

It is to be understood that the forms of our invention herewith shown and described are to be taken as preferred examples of the same and that various changes in the shape, size, and arrangement of parts may be resorted to without departure from the spirit of the invention or the scope of the subjoined claims.

We claim:

1. A toy lawn mower comprising, in combination, a housing with a supporting structure thereon; an elongate propelling handle connected with said housing; a transparent engine element simulating the configuration of a reciprocating engine mounted on said supporting structure and including a pair of vertically disposed transparent cylinders visible to the operator; a piston reciprocably mounted in each of said cylinders; a horizontally disposed, simulated cutting blade including a hub rotatably mounted below said pistons and visible to the operator; at least one axle and pair of wheels mounted on and supporting said housing; and means for driving said piston and blade including a drive wheel fixed to said axle and drivably supporting the hub of said blade; an arcuate cam fixed to the upper surface of said hub; and a pivotally mounted walking beam having arcuate bottom edges alternately drivably supported by said hub cam, said beam being pivotally connected to said pistons to effect reciprocation thereof upon rotation of said wheels, drive wheel, and said cam.

2. The combination recited in claim 1 wherein said supporting structure is transparent and integral with said engine element.

3. The combination recited in claim 1, a clicker gear wheel fixed to said axle, and a resilient deflectable tongue mounted on said structure and engaging the gear wheel to produce successive noises upon its rotation to simulate the sound of a mower engine.

4. The combination recited in claim 1, and means simulating the appearance and sound of a recoil starter and its housing respectively mounted on said supporting structure.

References Cited by the Examiner

UNITED STATES PATENTS

| | | | |
|---|---|---|---|
| 1,773,667 | 8/1930 | Fuqua | 46—114 X |
| 1,977,457 | 10/1934 | Smith | 46—39 X |
| 2,781,609 | 2/1957 | Allen | 46—39 |

FOREIGN PATENTS 513,577   6/1955   Canada.

F. BARRY SHAY, *Primary Examiner.*